Patented Dec. 14, 1937

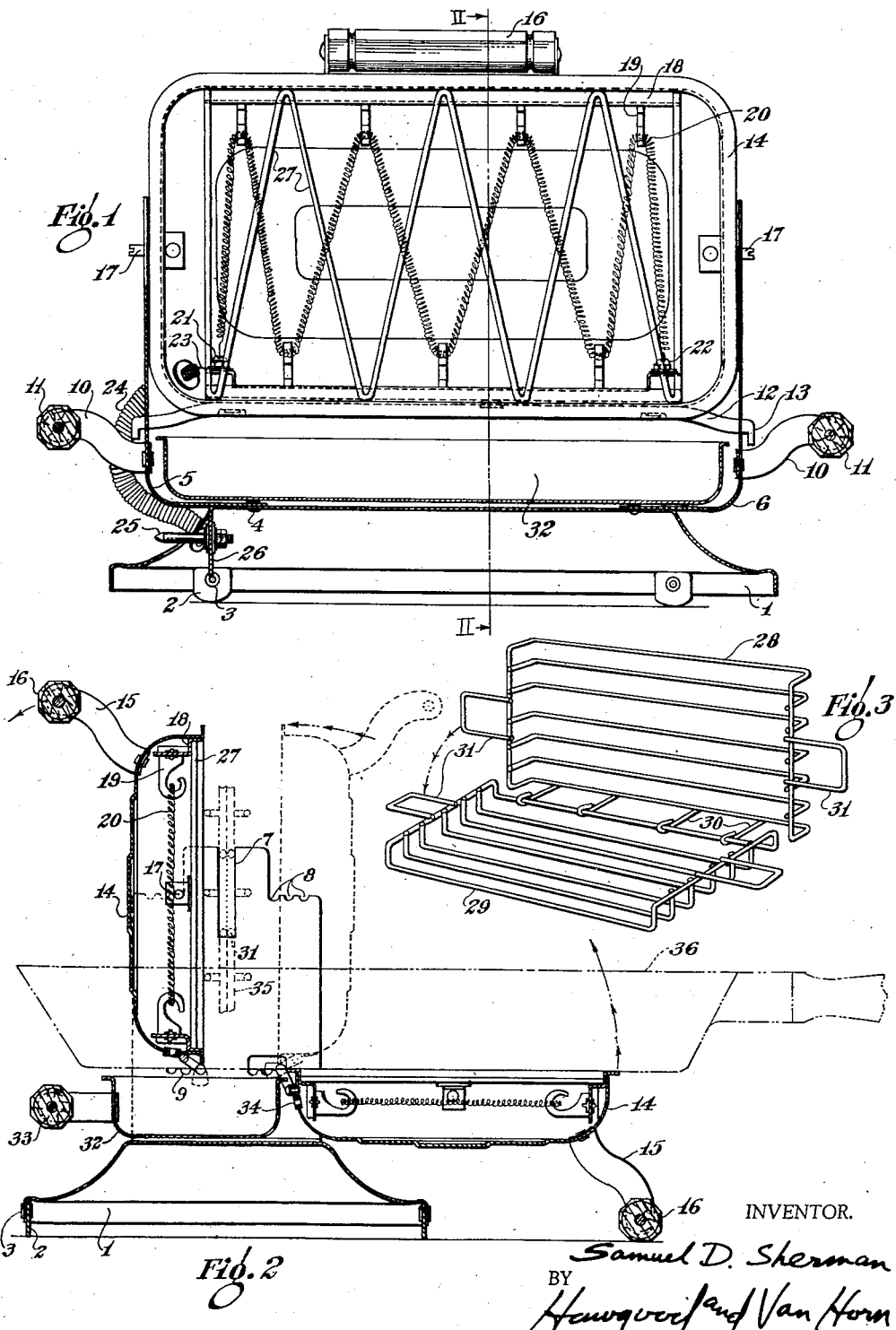

2,102,097

UNITED STATES PATENT OFFICE 2,102,097

COOKING APPARATUS

Samuel D. Sherman, Cleveland, Ohio, assignor to The Forestek Plating & Manufacturing Company, a corporation of Ohio Application July 27, 1935, Serial No. 33,524

6 Claims. (Cl. 53—5)

This invention relates to cooking apparatus and is particularly applicable to apparatus in which cooking is accomplished by electrically generated heat.

An object of the invention is to provide an improved cooking apparatus which may be used in a plurality of ways.

Another object is to provide an improved cooking apparatus which will be thermally efficient.

Another object is to provide an improved cooking apparatus in which heat may be applied either to two sides of an article to be cooked or to a single side thereof.

Another object is to provide an improved cooking apparatus which will be compact and small in size.

Another object is to provide an improved cooking apparatus which will be neat and attractive in appearance.

Another object is to provide an improved cooking apparatus which may be easily and economically manufactured.

Another object is to provide an improved cooking apparatus in which the position of heating elements may be varied.

Other objects will hereinafter appear.

The invention will be better understood from the description of one practical embodiment thereof, illustrated in the accompanying drawing, in which;

Figure 1 is a central longitudinal sectional view of a cooking apparatus for use upon a table, Figure 2 is a transverse sectional view thereof, taken on the line II—II of Figure 1, and Figure 3 is a perspective view, to a reduced scale, of a food retainer or holder to be used with the apparatus of the first two figures.

The apparatus illustrated consists of a base 1 shown as pressed of sheet metal and resting upon insulating feet 2 secured to the base by rivets 3. Rigidly secured to this base, as by rivets 4 are two upstanding brackets 5 and 6, each provided with a deep central notch 7 and with two series of notches 8 on its side and with two serrated slots 9. Handles 10 having wooden or other insulating gripping portions 11 are riveted or otherwise secured to the brackets.

Passing through each pair of serrated slots is a rod 12 having upset ends 13, and to each rod is secured a generally rectangular casing or shell 14 provided with a handle 15 with an insulating grip 16. Each casing 14 is provided with a pair of projecting pins 17 or other projections spaced a substantial distance from rod 12 in position to be placed selectively in any notch 8 at the top of and at its side of the brackets. In this manner, each shell may be retained in any desired one of a plurality of upwardly extending positions.

Within each casing member is a generally Z-shaped metal framework 18 and carried upon it are insulating supports 19 on which is carried an electrical heating element 20 shown as a coil of resistance wire. The ends of this element are connected to terminals 21 and 22, to which are also connected the ends of electrical conductors 23, preferably insulated wire, passing through flexible conduits 24 to electrical contacts 25 supported upon an insulating support 26 upon the base and arranged to be connected by the well known form of extension cord and plug with an outlet of a lighting circuit or the like.

An element protecting grill is formed across the open face of each casing or shell 14 by a series of bars or wires 27 secured to framework 18 as by welding, riveting or in any desired manner.

Two wire frames 28 and 29 are hinged together in offset relation by wires 30, forming in effect two small spaced grid irons. They are also provided with two pairs of wire loops or handles 31 which are adapted to be slid into the deep central notches 7 of the brackets.

A generally rectangular pan 32 having a handle 33 rests between the brackets on the top of the base, extending under the lower sides of the shells. These sides of the shells are perforated as at 34 to permit any liquid entering them to drip into the pan, while any liquid issuing from articles held between the grid irons may drop directly therein.

The device may be operated in either of the following ways:

(1) The operator may place articles to be cooked, such as pieces of meat or the like, between the grid iron sections, closing these sections upon the article, and inserting the handles 31 within the slots 7 in the brackets, in the position indicated at 35. He then raises the shells to vertical position by means of their handles, moving them inwardly or outwardly as he sees fit, positioning the rods 12 in any of the serrations of the slots 9 and the pins 17 in any of the notches 8 he desires. He then turns on the current supplied to the heating elements which throw their heat directly on both sides of the articles, effectively and efficiently cooking them. Any juices which flow out of the articles run directly into the pan; or—

(2) The operator may lower both shells to the horizontal position indicated at the right in Figure 2, so that the handles 16 rest upon the horizontal surface of a table or other article on which the device may be supported. In this position, the open faces of both shells are in the same horizontal plane, and the joint surface provides a cooking space on which a pan 36 or other cooking implement may be positioned, and the device used much in the manner of the ordinary stove burner.

While I have described the illustrated embodiment of my invention in some particularity, obviously many others will readily occur to those skilled in this art, and I do not, therefore, limit myself to the precise details shown and described but claim as my invention all embodiments, variations and modifications thereof coming within the scope of the appended claims.

I claim:

1. Cooking apparatus comprising a base, two brackets secured thereto, two open-sided shells pivotally supported by said brackets, heating elements within said shells, a supporting grill secured to the open side of each shell, means retaining said shells in a plurality of positions, said means comprising extensions on said shells remote from the pivotal connection, and a plurality of engaging surfaces on said brackets.

2. Cooking apparatus comprising a base, two brackets secured thereto, two open-sided shells pivotally supported by said brackets, heating elements within said shells, a supporting grill secured to the open side of each shell, means retaining said shells in a plurality of positions, said means comprising extensions on said shells remote from the pivotal connection, a plurality of engaging surfaces on said brackets, and handles secured to the shells and serving with the base to support the shells in horizontal position.

3. Cooking apparatus comprising a base, two brackets secured thereto, two open-sided shells pivotally supported by said brackets, heating elements within said shells, a supporting grill secured to the open side of each shell, means retaining said shells in a plurality of positions, said means comprising extensions on said shells remote from the pivotal connection, a plurality of engaging surfaces on said brackets, handles secured to the shells and serving with the base to support the shells in horizontal position, two hinged grills, and means on said brackets for supporting said grills in parallel vertical position between the heating elements.

4. Cooking apparatus comprising a base, two brackets secured thereto, two open-sided shells pivotally supported by said brackets, heating elements within said shells, a supporting grill secured to the open side of each shell, drainage means through said shells, and a liquid receiving reservoir positioned between said brackets and under said drainage means.

5. Cooking apparatus comprising a base having two upwardly extending bifurcated brackets, two hinged grills each provided with oppositely disposed handles, the handles adapted to be inserted between the furcations of said brackets, and movable heating elements positioned at the sides of said grills when supported by the brackets.

6. Cooking apparatus comprising a base having two upwardly extending bifurcated brackets, two hinged grills each provided with oppositely disposed handles, the handles adapted to be inserted between the furcations of said brackets, movable heating elements positioned at the sides of said grills when supported by the brackets, and a liquid receiving reservoir positioned between said brackets and beneath said grill.

SAMUEL D. SHERMAN.